US006567852B2

United States Patent
Besaw et al.

(10) Patent No.: US 6,567,852 B2
(45) Date of Patent: May 20, 2003

(54) WEB USER INTERFACE SESSION AND SHARING OF SESSION ENVIRONMENT INFORMATION

(75) Inventors: Lawrence M. Besaw, Fort Collins, CO (US); Judith Catherine Walker, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/952,110

(22) Filed: Sep. 14, 2001

(65) Prior Publication Data

US 2002/0078212 A1 Jun. 20, 2002

Related U.S. Application Data (63) Continuation of application No. 09/086,631, filed on May 29, 1998, now Pat. No. 6,308,212.

(51) Int. Cl.[7] .............................................. G06F 15/16
(52) U.S. Cl. ........................ 709/228; 709/227; 709/311; 709/328; 709/329
(58) Field of Search ................................ 709/228, 311, 709/328, 329, 227

(56) References Cited

U.S. PATENT DOCUMENTS

| | | | | |
|---|---|---|---|---|
| 5,561,802 A | | 10/1996 | Orimo et al. ................ 395/700 |
| 5,758,110 A | * | 5/1998 | Boss et al. ................... 345/751 |
| 5,795,228 A | * | 8/1998 | Trumbull et al. .............. 463/42 |
| 5,826,051 A | * | 10/1998 | Porter et al. ................. 345/810 |
| 5,835,724 A | | 11/1998 | Smith ...................... 395/200.57 |
| 5,838,916 A | * | 11/1998 | Domenikos et al. ......... 345/753 |
| 5,862,377 A | | 1/1999 | Lee .............................. 395/680 |
| 5,875,296 A | | 2/1999 | Shi ........................ 395/188.01 |
| 5,878,219 A | | 3/1999 | Vance, Jr. et al. ....... 395/200.47 |
| 5,901,313 A | | 5/1999 | Wolf et al. .................. 395/682 |
| 5,958,013 A | | 9/1999 | King et al. .................. 709/227 |
| 5,961,601 A | | 10/1999 | Iyengar ....................... 709/229 |
| 5,964,836 A | | 10/1999 | Rowe et al. ................. 709/221 |
| 5,983,227 A | | 11/1999 | Nazem et al. ................. 707/10 |
| 5,987,517 A | | 11/1999 | Firth et al. ................... 709/230 |
| 6,094,655 A | | 7/2000 | Rogers et al. ................. 707/10 |
| 6,175,877 B1 | | 1/2001 | Zerber ......................... 709/310 |
| 6,204,847 B1 | * | 3/2001 | Wright ........................ 345/804 |
| 6,338,064 B1 | * | 1/2002 | Ault et al. ..................... 707/10 |
| 2001/0014839 A1 | * | 8/2001 | Belanger et al. ............ 700/245 |

FOREIGN PATENT DOCUMENTS

WO    WO 9843150 A2 * 10/1998

OTHER PUBLICATIONS

Richardson et al., Virtual Network Computing, Feb. 1998, IEEE Internet Computing, pp. 33–38.*

Lee et al., Design and Implementation of Important Applications in a Java–Based Multimedia Digital Classroom, Aug. 1997, IEEE Transactions on Consumer Electronics, vol. 43, No. 3, pp. 264–270.*

* cited by examiner

Primary Examiner—Glenton B. Burgess
Assistant Examiner—Bradley Edelman (57) ABSTRACT

A Web user interface session is initialized in such a way as to allow certain contextual environmental information associated with a user, including session properties such as user name, user role, and locale, to be shared between all applications invoked during the web user interface session. Application programming interfaces (APIs) are disclosed that provide access to the environmental information for both common gateway interface (CGI) programs as well as Java applets. The sharing of the environmental information between session applications allows a consistent user interface to be presented to the user during the session.

31 Claims, 5 Drawing Sheets

WEB USER INTERFACE SESSION AND SHARING OF SESSION ENVIRONMENT INFORMATION

This application is a continuation of Ser. No. 09/086,631 filed May 29, 1998 U.S. Pat. No. 6,308,212.

FIELD OF THE INVENTION

The present invention relates generally to windows-based computer applications, and more particularly to a web user interface session and the sharing of session context information in such a session.

BACKGROUND OF THE INVENTION

Today Web applications launched from a particular Web browser instance generally operate independently. They do not know about each other or share any common properties. For example, Common Gateway Interface (CGI) programs and Java applets get their environment from different sources. A CGI program is configured by passing it CGI tokens through the universal resource locator (URL) or querying the user. A Java applet is configured by Java applet parameters or querying the user. There is no common mechanism for sharing information across Web applications.

A current mechanism that can be used to share information across some Web applications is Web browser cookies. A named Web browser cookie can be shared by multiple CGI programs. While the Web browser cookie is an enabling mechanism, it is insufficient in itself due to some limitations. First, Web browser cookies are not directly accessible by Java applets. Second, many Web browsers have a per server limit on the number of Web browser cookies and the size of Web browser cookies (in order to avoid attacks from malicious programs); this puts a fixed upper limit on the amount of information that can be shared via Web browser cookies.

Two other aspects relevant to the concept of a Web session are missing from today's situation. First, there is no program to initialize the session context information so that it can be inherited by other Web applications. Initializing the session context information may involve allowing the user to set session properties. Second, there is no unified login model to authenticate the user and determine the user's access rights for the session. There are Web server-specific security mechanisms, but these do not provide authentication and authorization information to Web applications in a platform-independent manner.

SUMMARY OF THE INVENTION

It is therefore an object of the present invention to be able to initialize contextual environmental information of a Web user interface session so that it can be shared with other valid applications of the same Web user interface session.

Therefore, according to the present invention, a method for the sharing of session environment information between session applications during a Web user interface session is disclosed. The Web user interface session is initialized so as to allow certain session properties associated with a user, such as user name, user role, and locale, to be shared between all applications invoked during the Web user interface session. Application programming interfaces (APIs) are disclosed that provide access to the environmental information for both common gateway interface (CGI) programs as well as Java applets. The sharing of the environmental information between session applications allows a consistent user interface to be presented to the user during the session.

To accomplish this sharing of session properties between applications, the user first performs a login to the session during which the user name and password are entered by the user. If the user is validated, the Web user interface session is initiated and the session properties of the environment of the session are defined. An initial session application of the session is opened, based on the universal resource locator (URL) submitted by the user to the web browser to initiate the session. Any applications that are subsequently opened during the Web user interface session from the initial session application will share the session properties of the environment.

Session information is shared among Web applications through a session manager program that maintains the session properties that define the environment for the session. Common gateway interface (CGI) programs access these session properties by using interprocess communication (IPC) to make requests to the session manager program. Java applets access these session properties through a specific common gateway interface (CGI) program that returns the session properties in a specified format.

Communication with the session manager program to get session properties occurs as follows. The requesting session manager connects to a port on which the session manager program is listening. Next, the requesting session application provides a session number, a remote IP address of the session, and a request for the session properties to the session manager program. The session number is derived from a special Web browser cookie. If the session number and the remote IP address match those of the session, then the session manager program releases the session property information to the requesting session application.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

DESCRIPTION OF THE INVENTION

The present invention introduces the concept of a Web user interface (UI) session and the sharing of session environment information during such a Web UI session across Web applications. A "Web application" is a computer program started as a result of invoking a URL via a Web browser. Common examples of Web applications are Java applets and Common Gateway Interface (CGI) programs. One of ordinary skill in the art will know that the term "Web" refers to both the Internet and, more particularly, to the World Wide Web or "WWW," a subset of the Internet. The UI is commonly a graphical user interface, or GUI.

A session refers to a group of applications associated with a particular user on a particular display. Thus, a set of programs that are tied together and function as a group under the control of a single user at a single display station constitute a session. A Web UI session is a set of Web applications launched from a particular Web browser instance. Not all of the Web applications launched from a particular Web browser instance need to belong to the same session. A Web browser instance may support multiple Web UI sessions, as well as independent Web applications that do not belong to any session.

A Web session is typically started when the user does a login. This brings up an initial application for the session. All applications then invoked through this initial application (through menu items, toolbar buttons, dialog boxes, tree list items, and so on) are also part of the session. This process is recursive, so that applications invoked through applications invoked from the initial application are all part of the Web Session. There is a common environment shared by all applications that are part of the Web session. This environment is a set of named property values, such as user name, user role, locale (language), and so on that affects the behavior of all applications that belong to the session and allows them to provide a consistent UI to the end user. All the Web applications that belong to the session effectively share or "inherit" a common environment or set of context information.

Figure 4:
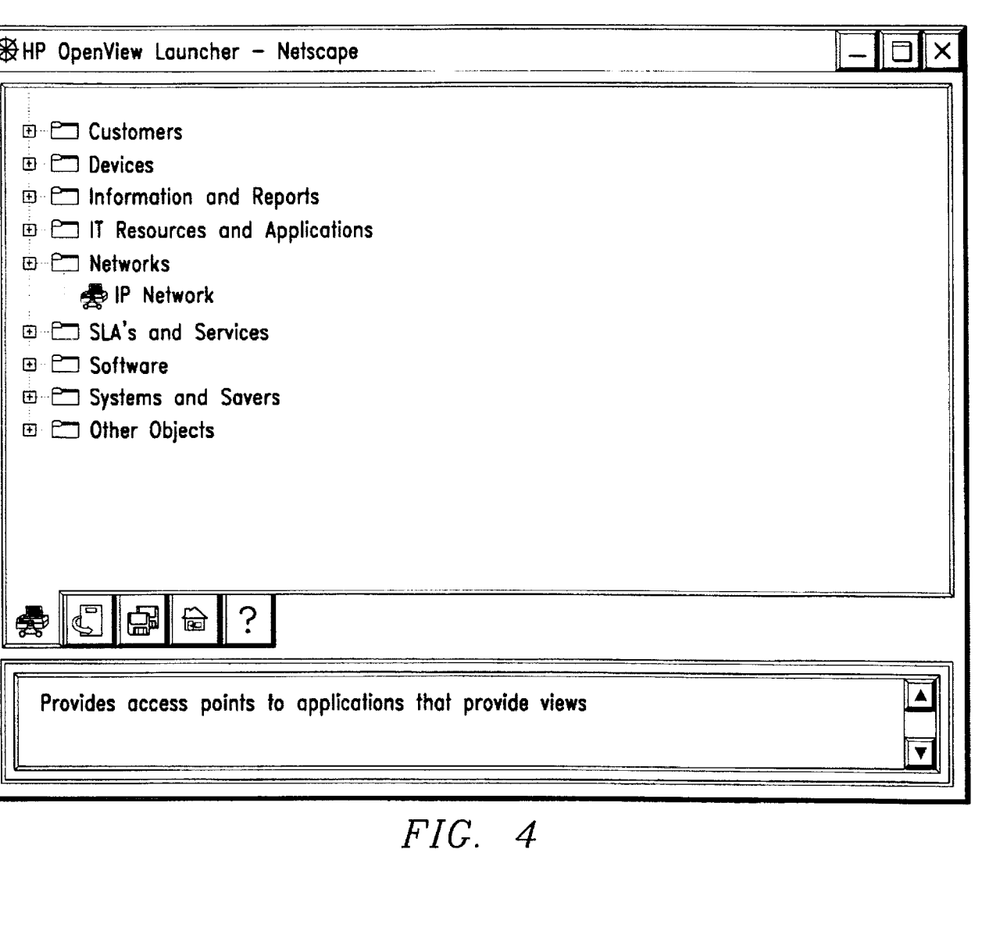
FIG. 4 illustrates a launcher window, according to the present invention.

The initial application for a session may be a program that provides a top-level launcher. The sole purpose of this launcher is simply to present the user with the choice of Web applications that the user can request as part of the session. An example of a launcher window is shown in FIG. 4. However, a session may not have a launcher presented as its initial application. The initial application may be any Web application.

The Web UI session is initiated when the user requests the launch URL via Web Browser. The launch program, shown as launch CGI program 14 in FIG. 1 and described below, brings up either the launcher window, shown in FIG. 4, or an arbitrary URL that can be used to start the Web UI session via a saved bookmark or to provide an "alternative launcher" or top level entry point for a particular user. Depending upon whether login is enabled, the user will be requested to log in before the session is started.

A Web UI session is terminated in one of three ways. First, the session is terminated if the user exits the Web Browser. Second, the session is terminated if the session has been inactive for some configured period of time; for instance, the timeout period may be defined as nine hours of inactivity. If the session times out, the user will be asked to login again the next time an action is requested. Third, the session is terminated if the Web Server system is shutdown, thereby causing all current sessions associated with that Web Server to be terminated.

The user typically logs into a Web UI session by providing a login name and password. The user may additionally specify a locale, i.e. language, at login for the display of localized data that remains in effect for the duration of the session. All applications started by the session inherit the locale information and are expected to honor it. There are two types of locale names—A Web locale name and an operating system (OS) locale name. Web locale names are platform-independent and are used by Java applets for localization. The OS locale names are platform-dependent and are used by CGI programs for localization.

User authentication is accomplished through a user name and password. In addition to users, there are user groups. Users may be assigned to any number of user groups for authorization purposes. These user groups are also called user roles, since they determine the role that the user will assume when logged into the Web UI session. For instance, there is an access control list associated with each URL that the user can invoke through the launcher to ensure that the user is authorized to launch a particular URL. Only those URL actions that are valid for a user's role will be visible in the launcher window.

Any application that is subsequently started as a part of the session then inherits a common set of session information, such as session identity (ID) or number, the user's name, the user's role, Web locale, and operating system (OS) locale. This session information is made available to applications that subsequently join the session through an appropriate application programming interface (API), such as a C API for GGI programs and a Java API for Java applets. Additionally, session applications may create new session properties and set values for them, which are then shared by other applications belonging to the session. For example, there could be a property that represents a "selected node list." When a new application is started it can then immediately display some appropriate information for these nodes without asking the user to re-enter the node list. The sharing of common session information allows the applications that belong to a session to share a common environment or context, such as what locale (language) to use for displaying information to the user via the UI.

Figure 1:
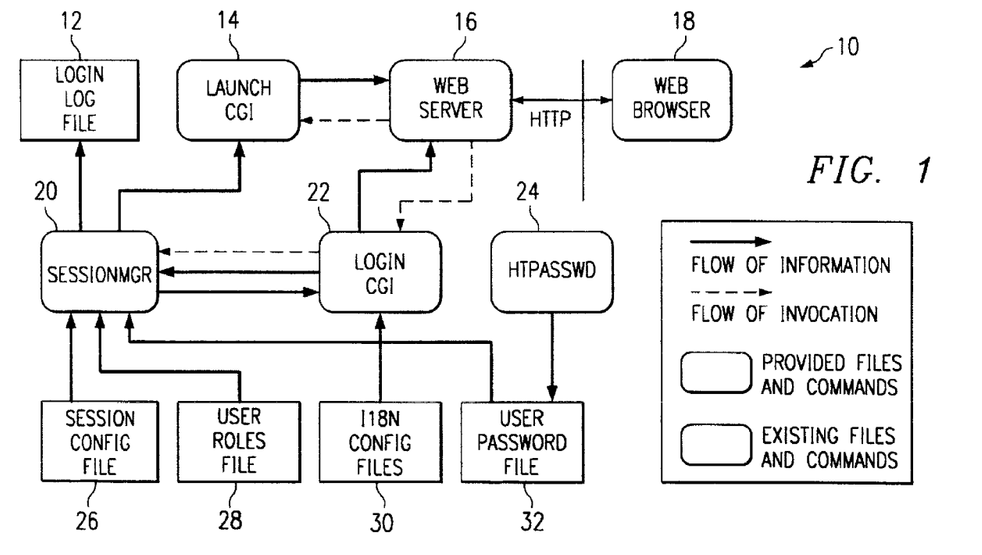
FIG. 1 illustrates the components of a web launcher that are involved in session initialization and login procedures, according to the present invention.

Referring now to FIG. 1, diagram 10 illustrates the components of the Web launcher that are involved in the session initialization and login procedures. Web Browser 18 is a management station or management console that has the appropriate UI server software installed. For a given Web Browser 18 one Web UI session is allowed per Web Server 16. Thus, Web Browser 18 may have multiple sessions, but only one session for Web Server 16. With multiple Web Browsers 18, a given user may have multiple sessions to Web Server 16.

Sessionmgr program 20 is a program that maintains session state information and acts as a server for session information. Sessionmgr program 20 listens on the port for session initiation requests that can come from either login program 22 or launch CGI program 14. Login program 22 is a CGI program that processes login requests and launch program 14 is a CGI program for starting a session and executing universal resource locators (URLs). Sessionmgr program 20 receives information from session config file 26, user roles file 28, and user password file 32. Login CGI program 22 receives information concerning locale from I18N config file 30, as shown.

The session requester, whether launch CGI program 14 or login CGI program 22, provides the following information to sessionmgr: the user name, the user password, and the remote IP address. Upon session initialization, the following global values are updated if they have changed: the user login, logging of logins to the session, logging of access to the session, and the session timeout. The session timeout is the amount of time of non-activity, such as nine hours, after which the session will automatically terminate.

The user is next validated. If the user login function is off, then a session is created without further authentication. If, however, the user login function is on, the sessionmgr program 20 reads the user's password (originally created by htpasswd 24). If the password entered by the user matches the encrypted password for the user in the user password file 32, then the user is authenticated. Otherwise, sessionmgr program 20 will return an error, which will result in the login CGI program 22 displaying an HTML error message to the user, asking the user to retry to login procedure.

Once the user has been authenticated, sessionmgr program 20 creates a session for the user along with the initial session. The user name, user roles, the remote IP address associated with the session, and so on, are stored for future reference throughout the session. Sessionmgr program 20 assigns a session number to the session and returns the session number to indicate that a session has been successfully created.

The program requesting the session creation (either launch CGI program 14 or login CGI program 22) creates a Web browser cookie containing the session number. This Web browser cookie is used by subsequent CGI programs to validate that a session exists. The existence of the cookie itself is not sufficient to determine that a session exists. This would not be secure, since it is relatively easy for a Web browser user to create a cookie. The CGI program validates a session by connecting to the port for sessionmgr program 20 and passing the session number (obtained from the Web browser cookie) and remote IP address to sessionmgr program 20. If there is an active session having this session number and the session is associated with the indicated remote IP address, then the session is validated. This ensures that the user has previously been authenticated for the session (if required).

As an example of session initialization procedure, consider the procedure for logging into the session. Login CGI program 22 is a CGI program that processes login requests. It performs user authentication, initiates sessions and requests the initial URL of a session. The algorithm of login CGI program 22 first determines if there is a session for this particular Web Browser 18. If there is a session, the program returns a message indicating that the user is already logged on.

Figure 2:
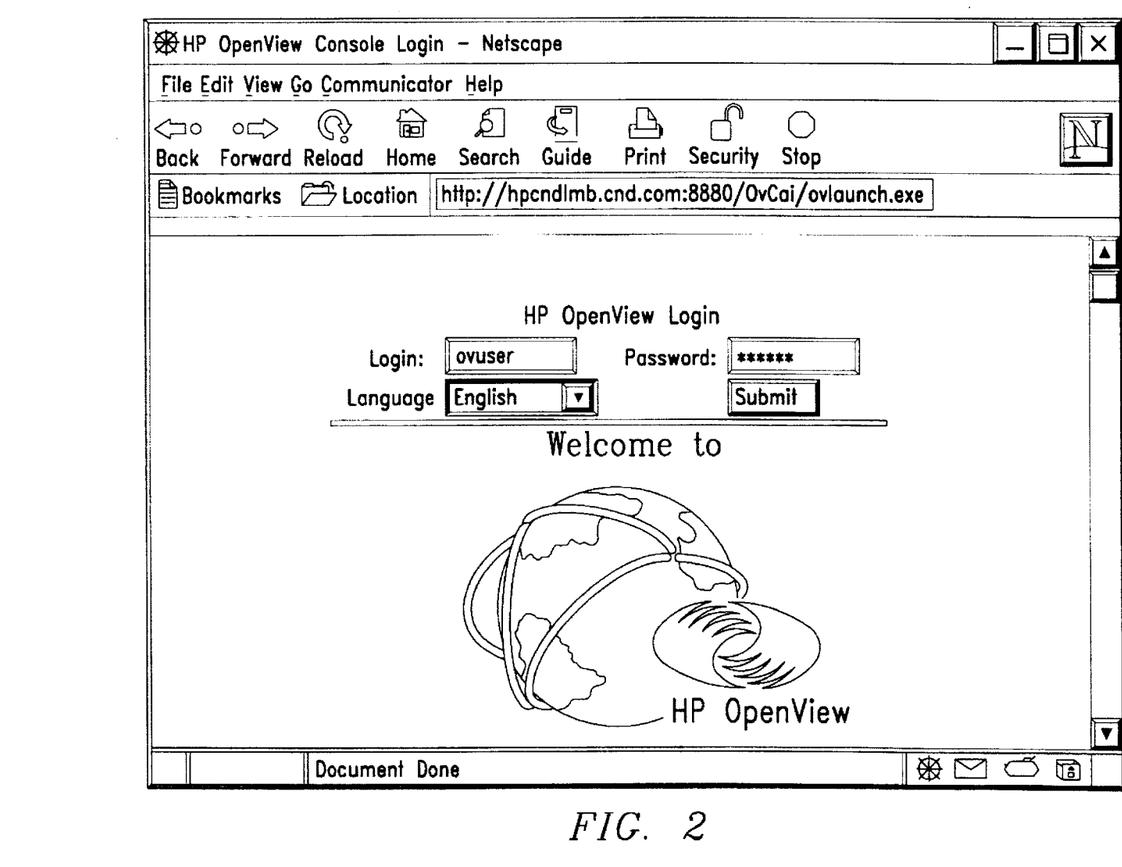
FIG. 2 illustrates a session login window, according to the present invention.

If there is no session, login CGI program 22 tries to connect to sessionmgr program 20 on a port; sessionmgr program 20 maintains the session. If sessionmgr program 20 is not currently running, then login CGI program 22 starts sessionmgr program 20. Once login CGI program 22 is connected to sessionmgr program 20, login CGI program 22 requests a new session and passes the following information to sessionmgr program 20: the user name, the user password, and the remote IP address. As shown in FIG. 2, a login window prompts the user for the user password and user name. The login window of FIG. 2 defines the beginning of the Web UI session and is one of the first windows that the user sees. Sessionmgr program 20 then creates the session and returns a session number if the user has been authenticated; the initial session number is randomly generated and this session number is incremented for each successive session. If the user is not authenticated, no session number is returned to login CGI program 22. Once the session is created, browser cookies that store the session number of the session and the user name (the latter is used to initialize the login screen if the user has to login again after a session timeout) are created. The user is successfully logged in once the session is created. If no URL is specified, the launcher window is displayed so that a URL may be initiated. If a URL is specified, the URL is started.

The launch CGI program 14 operates in similar fashion to login program 22. All actions launched from the launcher window, such as the launcher window shown in FIG. 4, will be executed by launch CGI program 14. Launch program 14 first checks to see if the user has logged in to determine whether there is a valid session. If there is no session, then the login page is returned to the user and prompts the login procedure discussed above. If there already is a session, the specified URL is invoked; this is the scenario depicted in FIG. 5. If no URL is specified, a launcher window is started. All the entries in the launcher window are URLs that are invoked via the launch CGI program.

Figure 3:
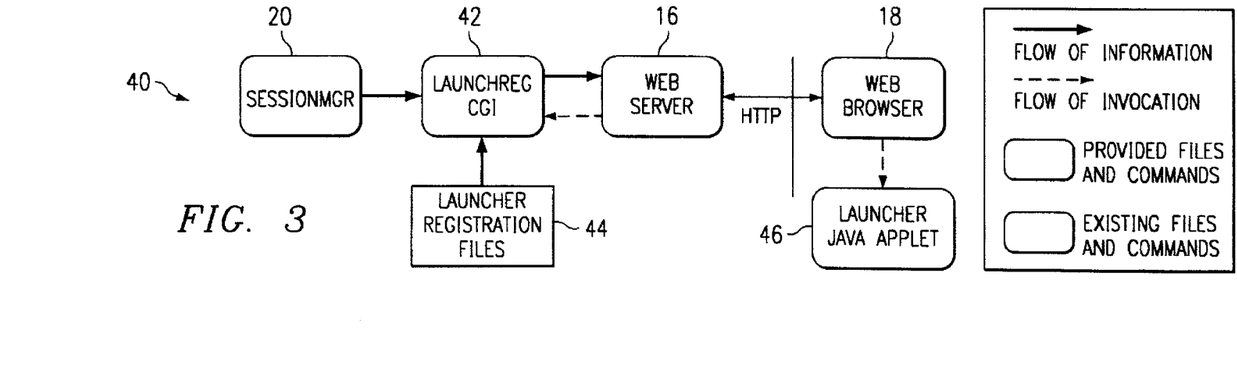
FIG. 3 illustrates a diagram for initializing a launcher window; according to the present invention.

Referring now to FIG. 3, the diagram 40 for initializing a launcher window is shown. The launcher is a Java applet 46 that provides the display of management functionality and the launching of that functionality through URLs. Java applet 46 displays available operations to the user. When the launcher Java applet 46 first starts, it calls launchreg CGI program 42 to retrieve registration information for the launcher window. The registration information returned by launchreg CGI program 42 is based on the user roles for the current session. Launchreg CCI program 42 obtains the user role list for the current session through the C session API, which connects to sessionmgr program 20, as shown. The launchreg CGI program 42 returns registration information based on the locale of the current session and filtered according to the user roles for which the user is authorized. The output of the launchreg CGI program 42 is parsed by the launcher Java applet 46 to construct tree lists for presenting management functionality to the user. The user requests a URL by clicking on a desired leaf entry from the tree lists.

Figure 5:
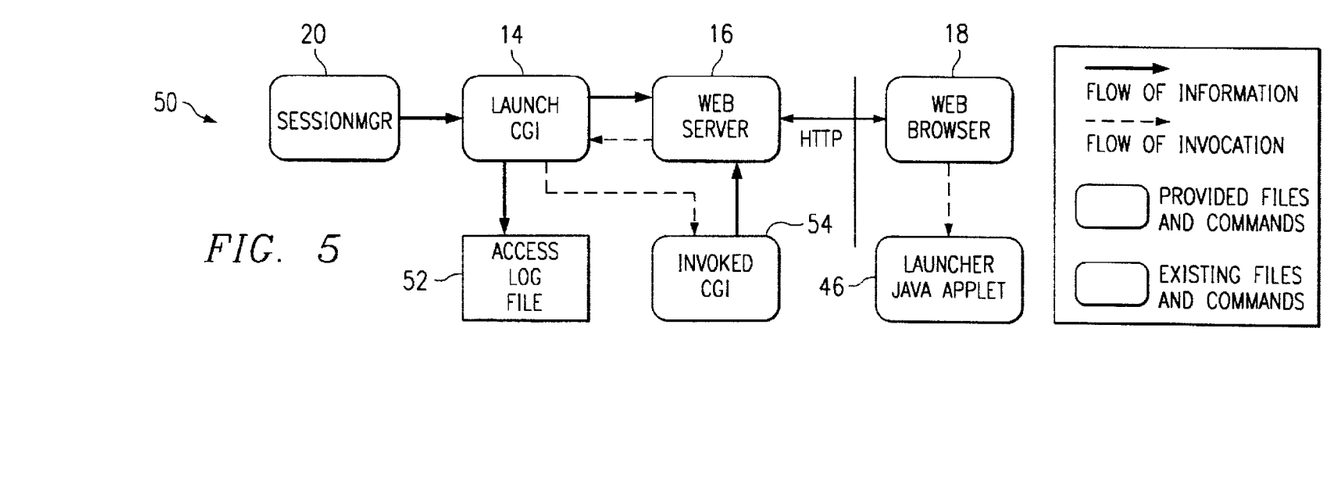
FIG. 5 illustrates a diagram for invoking URLs to start session Web applications, according to the present invention.

Referring to FIG. 4, an example of a launcher window seen by the user during a Web UI session, according to the present invention, is shown. The set of tasks available in the launcher window of FIG. 4 from which the user may choose include the following: Customers, Devices, Information and Reports, IT Resources and Applications, Networks (with IP Network being a specific task of Network tasks), SLA's and Services, Software, Systems and Servers, and Other Objects. These tasks help define the session; the set of tasks is based on the user's login entered in the login window of FIG. 2 and on associated user roles. FIG. 5 illustrates the components involved in invoking URLs.

Session information may be requested by a Web application belonging to the session at any time during the session. Information is requested by connecting to the port associated with sessionmgr program 20, passing the session number and remote IP address, and requesting the session information. Session information is not provided to the requester if there is no active session corresponding to the provided session number or if the provided remote IP address does not correspond to the remote IP address for the session. For performance reasons, any request for session information returns all session information. In other words, client caching is done so that subsequent requests for other session information can be quickly serviced without requiring another interprocess communication (IPC) request to the sessionmgr program 20.

The C session API is used by CGI programs to access session information while the Java session API is used by Java applets to access session information. Other language bindings for the session API (e.g., Perl) are also possible.

These APIs provide access to session information associated with a particular instance of a session and are the mechanism by which Web applications share session environment information. As previously mentioned, examples of session information include the name of the user, the roles of the user, and the locale used for providing localization of the user interface. Other session properties can also be defined. The session APIs allow the caller to (1) verify that a session exists; (2) get specified pre-defined session properties (e.g., user name); and (3) get and set developer-defined session properties (e.g., selected nodes, time interval). In addition, the C version of the session API allows applications to specify that the login screen should automatically be presented if the user is not currently logged in (i.e., there is not a current session and login is required).

Figure 6:
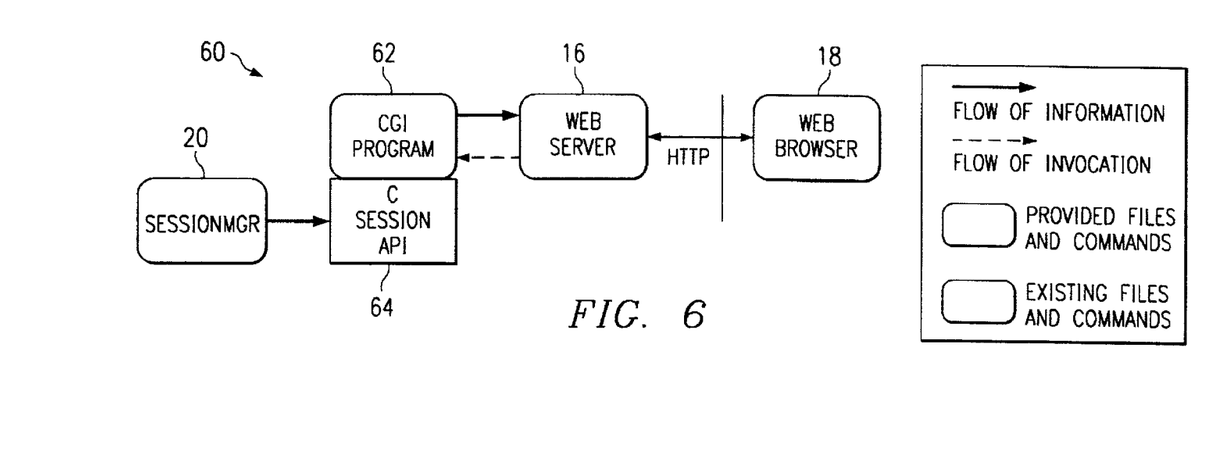
FIG. 6 is a diagram that shows the components of the Web launcher that are involved in the C language binding for the session API for CGI programs, according to the present invention.

Referring to FIG. 6, diagram 60 shows the components of the Web launcher that are involved in C session APIs for CGI programs. When a URL is invoked by Web Browser 18 (perhaps through the launcher Java applet 46, shown in FIG. 3), Web Browser 18 sends the request to Web Server 16. Web Server 16 starts the CGI program 62 identified by the URL. The CGI program is linked with a C Session API library 64 that contains the C Session API calls. When CGI program 62 calls the C session API calls, an interprocess communication (IPC) mechanism, such as TCP sockets, is used to communicate with sessionmgr program 20, which maintains session state information. C session API library 64 uses a special Web browser cookie to identify the session. The session number in the Web browser session cookie is passed to sessionmgr program 20 to identify the session. Sessionmgr program 20 returns the session information to the C session API library call 64 through IPC and the C session API library 64 in turn returns the session information to the requesting CGI program 62.

Figure 7:
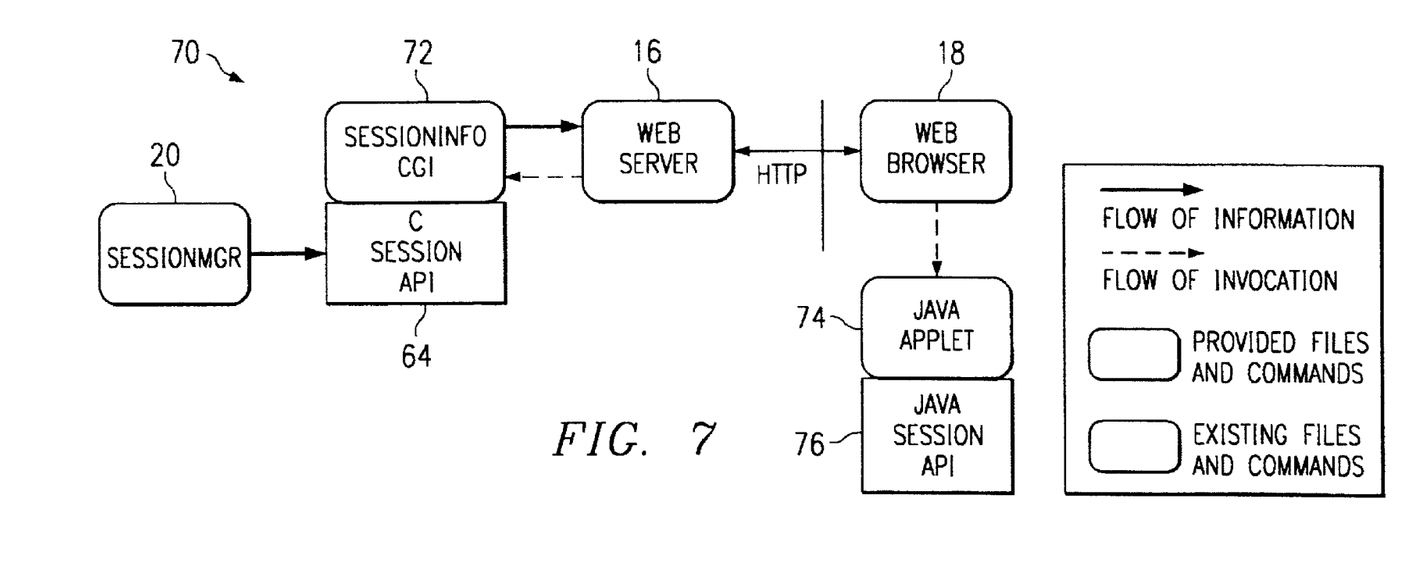
FIG. 7 is a diagram that shows the components of the Web launcher that are involved in the Java language binding for the session API for Java applets.

Referring now to FIG. 7, diagram 70 shows the components of the Web launcher that are involved in Java session APIs for Java applets. The Java session API illustrated in FIG. 7 allows Java applets that are part of the same session to share session information. Java applet 74 uses a Java session class to access session information. When the Java session class is constructed, it makes a request to Web Browser 18 to invoke the URL to access the sessioninfo CGI program 72. Web Server 16 starts the sessioninfo CGI program 72 identified by the URL. Sessioninfo program 72 implements the Java session API and is linked with C session API library 64 as shown. When sessioninfo CGI program 72 calls the C session API calls 64, an interprocess control (IPC) mechanism, such as TCP sockets, is used to communicate with the sessionmgr program 20, which maintains session state information. The C session API library 64 uses a special Web browser cookie to identify the session. The session number in the Web browser session cookie is passed to sessionmgr program 20 to identify the session. Sessionmgr program 20 returns the session information to sessioninfo program 72, which in turn returns the session information to the invoking Java applet 74 via Web server 16 and Web Browser 18. The Java applet 74 caches the session information and makes the session information available through the Java session class.

Using the present invention, the user of a Web session application need only specify, or the session application determine, certain session information one time. This session information, such as the user's role, the user's login, Web and OS locale, selected nodes, etc., is then common to all session applications. This saves the user time since it is no longer necessary to provide this type of environment and contextual information each time a new application is launched. Another advantage of the present invention is the consistency it provides. The sharing of contextual information between applications of a Web session necessarily provides more consistency between the session applications than in the prior art. Without the Web session mechanism of the present invention, each application started from the Web browser would potentially need to authenticate the user and query for configuration parameters to set its environment. This environment would be specific to that Web application. There is no guarantee that separately started Web applications will have the same environment. The Web session concept allows multiple applications to be tied together and operate with a single environment.

While the invention has been particularly shown and described with reference to a preferred embodiment, it will be understood by those skilled in the art that various changes in form and detail may be made therein without departing from the spirit and scope of the invention.

What is claimed is:

1. A method for the sharing of session environment information between session applications during a Web user interface session, comprising:

logging in the user of the Web user interface session, wherein the Web user interface session comprises one or more session applications occurring during the life of the Web user interface session that function as a group under the control of the user;

initiating the Web user interface session and defining an environment of the Web user interface session having a plurality of session properties;

opening an initial session application of the one or more session applications of the Web user interface session that has the plurality of session properties of the environment; and sharing the plurality of session properties of the environment of the Web user interface session with any session application of the one or more session applications that is subsequently opened during the Web user interface session from one of the initial session application and the one or more session applications.

2. The method of claim 1, wherein during login, the user specifies a user name and a user password of the Web user interface session.

3. The method of claim 2, wherein during login, the user further specifies a locale of the Web user interface session.

4. The method of claim 1, wherein opening the initial session application of the Web user interface session occurs when the user requests a launch program via a web browser that opens up the initial session application.

5. A method for the sharing of session environment information between session applications during a Web user interface session, comprising:

logging in the user of the Web user interface session, wherein the Web user interface session comprises one or more session applications occurring during the life of the Web user interface session that function as a group under the control of the user;

initiating the Web user interface session and defining an environment of the Web user interface session having a plurality of session properties;

opening an initial session application of the one or more session applications of the Web user interface session that has the plurality of session properties of the environment, wherein opening the initial session application of the Web user interface session occurs when the user requests a launch program via a web browser that opens up the initial session application and wherein the initial session application is a launcher window that presents the user with a plurality of applications from which to chose the one or more session applications; and sharing the plurality of session properties of the environment of the Web user interface session with any session application of the one or more session applications that is subsequently opened during the Web user interface session from one of the initial session application and the one or more session applications.

6. The method of claim 1, wherein sharing the plurality of session properties of the environment with the one or more session applications that are subsequently opened during the Web user interface session is accomplished through an application programming interface.

7. The method of claim 6, wherein the application programming interface is an application programming interface for a common gateway interface program.

8. The method of claim 6, wherein the application programming interface is an application programming interface for a Java applet.

9. A method for the sharing of session environment information between session applications during a Web user interface session, comprising:

logging in the user of the Web user interface session, wherein the Web user interface session comprises one or more session applications occurring during the life of the Web user interface session that function as a group under the control of the user;

initiating the Web user interface session and defining an environment of the Web user interface session having a plurality of session properties;

opening an initial session application of the one or more session applications of the Web user interface session that has the plurality of session properties of the environment; and sharing the plurality of session properties of the environment of the Web user interface session with any session application of the one or more session applications that is subsequently opened during the Web user interface session from one of the initial session application and the one or more session applications, wherein sharing the environment of the Web user interface session with one or more session applications that are subsequently opened further comprises:

connecting a session application of the one or more session applications to a port connected to a session manager program that maintains the plurality of session properties of the environment of the Web user interface session;

providing a session number, a remote IP address of the Web user interface session, and a request for the plurality of session properties of the environment to the session manager program; and if the session number and the remote IP address are validated, providing the session application with the plurality of session properties of the environment from the session manager program.

10. The method of claim 9, wherein a program initiating the Web user interface session creates a browser cookie containing the session number.

11. The method of claim 1, further comprising:

adding a new session property to the plurality of session properties of the environment, wherein the new session property is shared by the initial session application and any session application of the one or more session applications that are subsequently opened during the Web user interface session.

12. The method of claim 1, wherein the plurality of session properties of the environment of the Web user interface session comprise a user name, a user role, and a locale.

13. A method for the sharing of session environment information between session applications during a Web user interface session, comprising:

logging in the user of the Web user interface session, wherein the Web user interface session comprises an initial session application and one or more session applications occurring during the life of the Web user interface session that function as a group under the control of the user;

initiating the Web user interface session and defining an environment of the Web user interface session having a plurality of session properties;

opening the initial session application of the Web user interface session that has the plurality of session properties of the environment; and opening one or more session applications of the Web user interface session from the initial session application; and sharing the plurality of session properties of the environment with the one or more session applications that are opened during the Web user interface session from the initial session application.

14. The method of claim 13, wherein during login, the user specifies a user name and a user password of the Web user interface session.

15. The method of claim 14, wherein during login, the user further specifies a locale of the Web user interface session.

16. The method of claim 13, wherein opening the initial session application of the Web user interface session occurs when the user requests a launch program via a web browser that opens up the initial session application.

17. A method for the sharing of session environment information between session applications during a Web user interface session, comprising:

logging in the user of the Web user interface session, wherein the Web user interface session comprises an initial session application and one or more session applications occurring during the life of the Web user interface session that function as a group under the control of the user, wherein the initial session application is a launcher window that presents the user with a plurality of applications from which to chose the one or more session applications;

initiating the Web user interface session and defining an environment of the Web user interface session having a plurality of session properties;

opening the initial session application of the Web user interface session that has the plurality of session properties of the environment; and opening one or more session applications of the Web user interface session from the initial session application, wherein opening the initial session application of the Web user interface session occurs when the user requests a launch program via a web browser that opens up the initial session application; and sharing the plurality of session properties of the environment with the one or more session applications that are opened during the Web user interface session from the initial session application.

18. The method of claim 13, wherein sharing the plurality of session properties of the environment with the one or more session applications that are opened from the initial session application during the Web user interface session is accomplished through an application programming interface.

19. The method of claim 18, wherein the application programming interface is an application programming interface for a common gateway interface program.

20. The method of claim 18, wherein the application programming interface is an application programming interface for a Java applet.

21. A method for the sharing of session environment information between session applications during a Web user interface session, comprising:

logging in the user of the Web user interface session, wherein the Web user interface session comprises an initial session application and one or more session applications occurring during the life of the Web user interface session that function as a group under the control of the user;

initiating the Web user interface session and defining an environment of the Web user interface session having a plurality of session properties;

opening the initial session application of the Web user interface session that has the plurality of session properties of the environment; and opening one or more session applications of the Web user interface session from the initial session application; and sharing the plurality of session properties of the environment with the one or more session applications that are opened during the Web user interface session from the initial session application, wherein sharing the environment of the Web user interface session with the one or more session applications that are opened further comprises:

connecting a session application of the one or more session applications to a port associated with a session manager program that maintains the plurality of session properties of the environment of the Web user interface session;

providing a session number, a remote IP address of the Web user interface session, and a request for the plurality of session properties of the environment to the session manager program; and if the session number and the remote IP address are validated, providing the session application with the plurality of session properties of the environment from the session manager program.

22. The method of claim 21, wherein a program initiating the Web user interface session creates a browser cookie containing the session number.

23. The method of claim 13, further comprising:

adding a new session property to the plurality of session properties of the environment, wherein the new session property is shared by the initial session application and any session application of the one or more session applications that are subsequently opened during the Web user interface session.

24. The method of claim 13, wherein the plurality of session properties of the environment of the Web user interface session comprise a user name, a user role, and a locale.

25. The method of claim 13, wherein opening the one or more session application is accomplished by one or more invokation mechanisms of the initial session application.

26. The method of claim 25, wherein the user is authorized to invoke the one or more session applications according to a user role of the user.

27. The method of claim 13, further comprising:

adding a new session property to the plurality of session properties of the environment, wherein the new session property is shared by the initial session application and the one or more session applications that are opened during the Web user interface session.

28. The method of claim 13, wherein the plurality of session properties of the environment of the Web user interface session comprise a user name, a user role, and a locale.

29. A method for sharing session environment information with common gateway interface programs during a Web user interface session that function as a group under the control of a user, comprising:

invoking a universal resource locator by a Web browser;

sending a request to a web server to start a common gateway interface program of one or more common gateway interface programs of the Web user interface session identified by the universal resource locator, wherein the common gateway interface program is linked with a C session application programming interface library that contains a plurality of C session application programming interface calls;

providing a session number to a session manager program that maintains a plurality of session properties of an environment of the Web user interface session by an interprocess communication mechanism in order to validate the Web user interface session;

if the session manager identifies the Web user interface session, returning the plurality of session properties of the environment from the session manager program to the C session application programming interface library; and providing the plurality of session properties from the C session application programming interface library to the common gateway interface program.

30. The method of claim 29, wherein the universal resource locator is invoked by the Web browser through a Java launcher applet.

31. The method of claim 29, wherein the session number is contained within a browser cookie created by a program that initiated the Web user interface session.

* * * * *